(12) United States Patent
Williams et al.

(10) Patent No.: US 7,441,041 B2
(45) Date of Patent: Oct. 21, 2008

(54) NETWORK DOWNLOAD REGULATION METHOD AND SYSTEM

(75) Inventors: Peter A. Williams, Woodinville, WA (US); Edward F. Reus, Woodinville, WA (US); Jeff S. Roberts, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 10/724,518

(22) Filed: Nov. 29, 2003

(65) Prior Publication Data
US 2005/0120040 A1 Jun. 2, 2005

(51) Int. Cl.
*G06F 15/16* (2006.01)
(52) U.S. Cl. ...................................... 709/232
(58) Field of Classification Search .................. 709/232
See application file for complete search history.

(56) References Cited

U.S. PATENT DOCUMENTS

| | | | | |
|---|---|---|---|---|
| 7,013,330 | B1* | 3/2006 | Tarbotton et al. | 709/219 |
| 2002/0002468 | A1* | 1/2002 | Spagna et al. | 705/1 |
| 2002/0100036 | A1* | 7/2002 | Moshir et al. | 717/173 |
| 2002/0143952 | A1* | 10/2002 | Sugiarto et al. | 709/227 |
| 2003/0177183 | A1* | 9/2003 | Cabrera et al. | 709/204 |

OTHER PUBLICATIONS

Jacobson, Van, "Congestion Avoidance and Control", ACM SIGCOMM Computer Communication Review, Symposium proceedings on Communications architectures and protocols SIGCOMM '88, vol. 18 Issue 4, Aug. 1988.*
Pulido et al., "SM: Real-Time Multicast Protocols for Simultaneous Message Delivery", Real-Time Computing Systems and Applications, 1998, Proceedings, Fifth International Conference, Oct. 1998, pp. 66-73, ISBN: 0-8186-9209-X.*

* cited by examiner

*Primary Examiner*—Jason Cardone
*Assistant Examiner*—William J Goodchild
(74) *Attorney, Agent, or Firm*—Workman Nydegger (57) ABSTRACT

A system and method by which content, such as a software update, is downloaded in a controlled manner to clients so as to reduce peak demands, by modulating the number of clients that can request (e.g., automatically) to download content. To this end, before any download is requested, each client receives information that the client uses to determine whether to request the content now, or back off and retry the download process later. In one implementation, the information is provided via a download regulation file, comprising acceptance percentage and time window parameters that are occasionally varied based on current network load-related statistics. Clients generate a random number that is evaluated against the acceptance percentage (probability threshold) to determine whether to download or back off. The time window specifies how long downloading clients are allowed to download, or how long backed-off clients need to wait before restarting the regulated download process.

16 Claims, 4 Drawing Sheets

NETWORK DOWNLOAD REGULATION METHOD AND SYSTEM

FIELD OF THE INVENTION

The invention relates generally to computer systems and the internet, and more particularly to downloading information to client computer systems.

BACKGROUND OF THE INVENTION

In a managed network such as a network owned by a corporation, distributing software releases (e.g., programs, patches, and other rollouts) has become a routine and relatively straightforward procedure. This is generally because the machines are in a highly-managed environment, owned by the company, and can be divided into logical groups (e.g., Administration, Accounting, Engineering and so forth). A managed network thus enables an enterprise to manage a software release according to network load and other priorities. Further, in order to cap network utilization, alternatives such as multicast are often available.

However, when distributing content over the internet to anonymous clients on the order of millions, the task of distribution becomes substantially more difficult. One reason is that the client systems are independently owned and managed, whereby privacy and control issues prevent traditional management-style control for distribution. Further, multicast style solutions are generally not available on the internet. As a result, only connection-oriented protocols (e.g., TCP/IP) can be considered, despite the scalability issues of such connection-oriented protocols.

In such large-scale content distributions, providing new content such as a software update for downloading by client systems tends to cause huge spikes in network activity. For example, when distributing a software patch over the internet, millions of clients can try to download the patch over a very short time period, overwhelming the data center's capacity and/or saturating network taps. To avoid rejecting too many client requests, since each rejection provides an undesirable user experience, the distribution capacity of the download facilities needs to be large enough to handle such spikes. Further, to continue to satisfy clients, this capacity needs to be continually increased over time, as more and more computer systems are becoming connected to the internet. This becomes very costly to the content provider.

The problems associated with large-scale software distributions can become more severe due to other factors. For example, the spikes in network activity are more severe when a network problem occurs, a download is larger then average, a second release closely follows a previous release, and/or an operational failure that reduces capacity occurs, causing incremental loading. For example, consider a network problem such as a loss of part of the internet backbone or related routers/DNS servers. Such an event can cause increased loading of alternate network paths, and may shift loading from one region of the internet to another, e.g., a problem in the eastern United States can cause a shift of loading, forcing servers in the western United States to take the additional load as client systems are redirected to the alternate (western United States) servers.

A large patch, or a rollup of several patches that is larger than normal will also increase server loading, because each individual client will remain connected for a longer than the average time. As a result, the total number of simultaneous connections and total bytes to be served to clients will increase in a corresponding manner, straining resources and possibly causing requests to be rejected. A similar problem generally causing the same effect on the network occurs when one release closely follows a previous release, because client systems compete for both updates and client systems remain connected longer in order to pick up both packages.

An operational failure at the data center may reduce the ability of server farms to deliver updates. For example loss of a network tap, router failure, DNS configuration problems or server hardware failures can all lead to problems providing the software to requesting clients.

In sum, content distribution over the internet is a complex, costly and unpredictable task. What is needed is a way for clients to obtain content, such as software updates, that does not overload the existing infrastructure, yet without significantly increasing, and sometimes even reducing, the expense to the content provider.

SUMMARY OF THE INVENTION

Briefly, the present invention provides a system and method by which clients' computer systems are directed by information from a content provider as to when to download content and for how long, such that the clients can regulate themselves with respect to downloading content from the network. In one aspect, the system and method control the initial spike of activity related to requesting content, thereby mitigating the problems associated with such spikes. In another aspect, the load is modulated after the initial demand for content, whereby the download facilities may be operated in a more efficient and cost effective manner.

To this end, before and (when necessary) during each download from live download servers, each client receives information (e.g., periodically) that controls downloading on the update system. For example, clients may be directed to back off from an ongoing download or delay a download that is about to start for a period of time. The client then automatically checks back later as to whether the initial download can occur, or if downloading has started and is temporarily paused, whether the download can resume.

In general, in one implementation, the operations center that publishes content gathers network statistics on the update website servers' load, as well as statistics for load on content servers (e.g., data centers) that propagate the updates. Based on the gathered network server and data center statistics, and possibly other criteria such as the size of the update, a set of information is created, provided to the client, and regularly updated. The set of data controls the clients' downloading behavior.

In one implementation, the set of data is provided to clients in the form of a download regulation file, containing parameters in the form of a download acceptance percentage and a download time value. The download acceptance percentage is a probability-related value that instructs each client as to whether that client should start a download, or continue a download if time had previously expired (based on the download time value) during a download. For example, if the acceptance percentage is seventy percent, then only (approximately) seventy percent of the clients will decide to download, such as by having each client generate a random number between zero and one and downloading only if the random number is below 0.7. Clients that generated random numbers or the like that do not meet the value corresponding to the acceptance percentage back off and retry later.

For each client that is downloading the file (based on whether the client met the acceptance percentage), the download time represents a time window in which the client can continue to download, or for clients that are not downloading, that is, those that have backed off, the download time represents a wait time before retrying. Note that in one implementation only a single download time may be provided for both purposes, however in an alternative implementation, the downloading window time and the wait time can be provided as separate parameters. If a system that is downloading cannot finish downloading the content within the time window, then that system will re-read the download regulation file, and make a new decision as to whether to resume downloading or wait. Similarly, upon expiration of the wait time for a system that is not downloading, the download regulation file is also re-read and the determination performed again as to whether to start/continue downloading, or to wait still further. Note that the download regulation file's data may have changed during the first time window, and re-reading it gets the latest parameter values.

As is understood, in the system and method of the present invention, the individual clients each perform the probability-based determination based on the data in the download regulation file. This shifts the burden of managing clients away from the distribution facility, and onto the clients themselves. In general, the distribution facility only needs to provide access (e.g., via a URL) to the download regulation file, and provide the updates. By setting the parameters in the download regulation file, the initial spike of downloads may be spread over a longer time, which reduces the overall network and server load, lowers congestion, and keeps systems and networks from becoming overloaded. The parameter values can then be varied as needed, e.g., based on empirical measurements. For example, the parameters may be set to initially start the download regulation file with a lower acceptance percentage, and then gradually raise the acceptance percentage, based on a strategy of smoothing and lowering the initial download spike in network activity by spacing apart the total number of client download requests. The download regulation file can be manually updated or automatically updated, e.g., regularly in a closed loop system based on network/server utilization. If a network or data center problem occurs, in order to keep the system from becoming overloaded and unstable, the client load can be modulated as needed by varying the download regulation file.

Variations and alternatives to the basic architecture may further enhance the experience perceived by clients, including reducing wait times and/or increasing the acceptance percentage for clients that have already waited. Adding or subtracting a random time to the acceptance time window is also straightforward to accomplish, so that, for example, if a large number of clients receive the download regulation file at the same time such as the start of a workday, the percentage-based number of download requests are not received at essentially the same time. Transient errors during downloading can cause the client system to automatically wait for some predetermined amount of time before retry, e.g., the client system can wait for a pre-determined time specified in the download regulation file before trying to reconnect, which may also be modified by a random time so that multiple clients do not attempt to reconnect at the same time. As another option, different download regulation files can be generated for different regions of the internet based on regional network and server statistics, because network traffic issues may be regional rather than global.

Other advantages will become apparent from the following detailed description when taken in conjunction with the drawings, in which:

DETAILED DESCRIPTION

Exemplary Operating Environment

Figure 1:
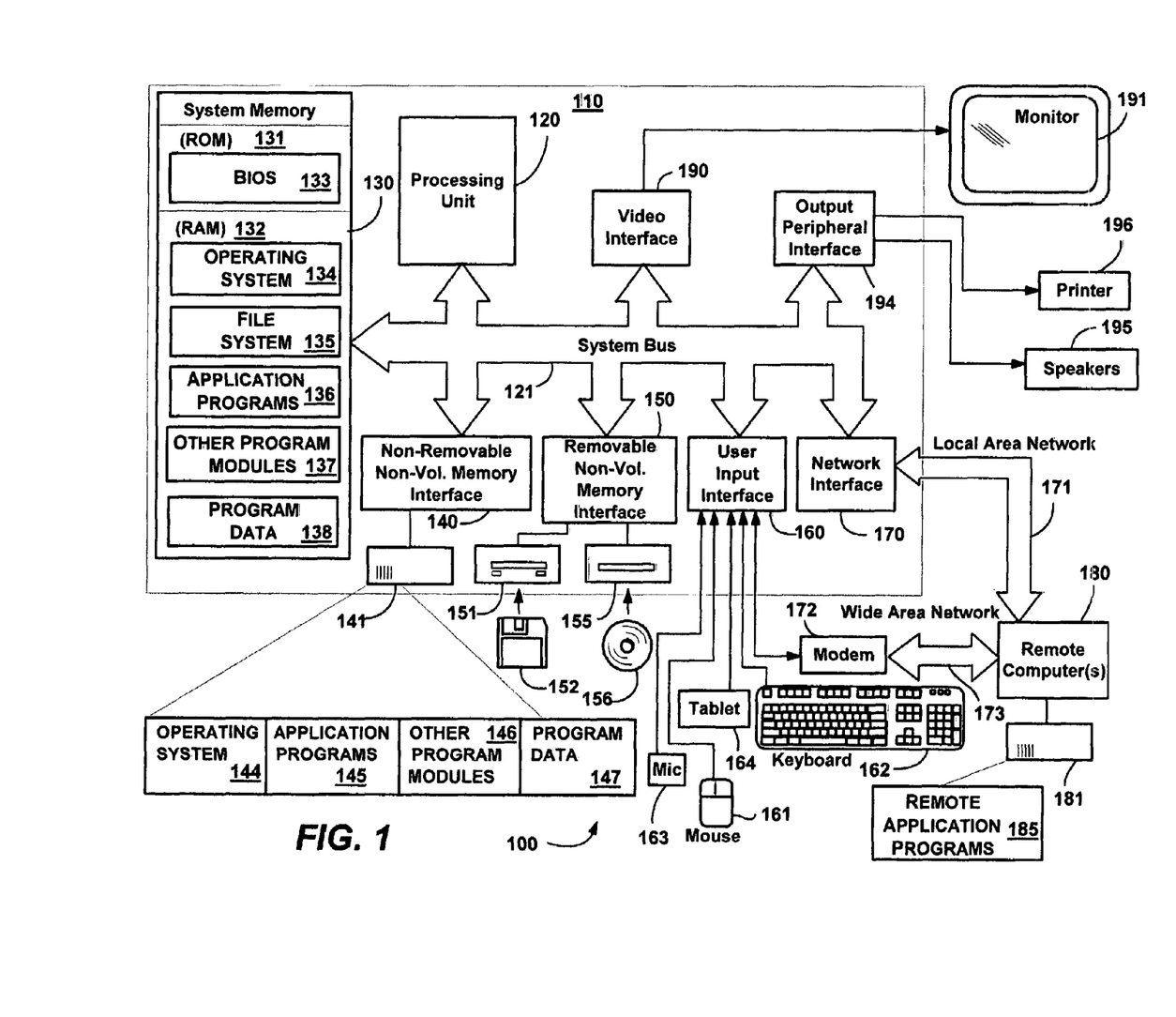
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, file system 135, application programs 136, other program modules 137, and program data 138.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 136, other program modules 137, and program data 138. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Network Download Regulation

For purposes of explanation, the present invention will primarily be described in the context of software updates (e.g., software patches) being sent to requesting clients. However, as will be understood, although the present invention provides significant benefits in providing software updates, the present invention is not limited to updates, but rather can be used to regulate the downloading of any content, including graphics, text, video, audio and other data, particularly content for which there is a very large demand that would otherwise strain the capacity of network distribution resources. For example, the initial release of a popular movie or song can spike demand for network distribution resources, as can sudden publicity about a website.

Further, the initial client requests will be described herein as being automatically initiated when the client computer is connected to the internet, but it should be understood that requests for downloads can be manually generated. Thus, for example, an automatic software update program can (and in a described implementation normally will) generate a request to obtain any necessary updates, as can a subscription-based or other such service, e.g., to automatically download newly-released content such as video data to the hard drives of registered clients in expectation of high demand, or based on previous behavior patterns. However a client user browsing the internet could also manually request a download that is regulated, for example, such as by having code in the browser component of the client computer comply with any download regulation directives provided by a website/content source. The download may also be regulated by having the server return a script or the like that is executed to perform the download in a manner directed by the content provider.

Figure 2:
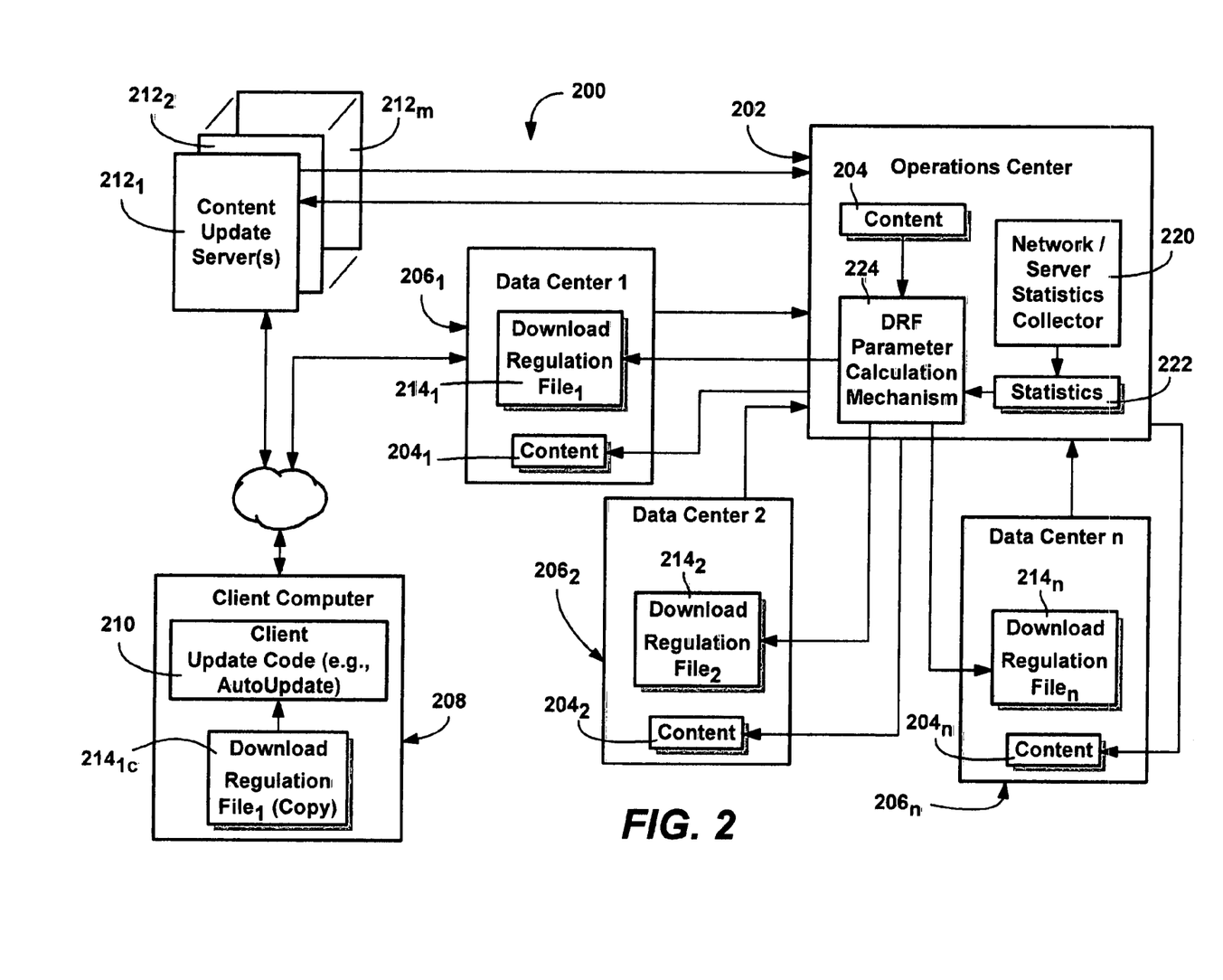
FIG. 2 is a block diagram generally representing a network in which a client's request for content results in a download regulation file returned to the client, in accordance with an aspect of the present invention.

Turning to FIG. 2 of the drawings, there is shown an example network 200 in which an operations center 202 (such as a software vendor's corporate network) provides copies $204_1$-$204_n$ of content 204 to data centers (content servers) $206_1$-$206_m$ for distribution over the internet. For example, the content 204 may comprise software updates developed by a software vendor or third party associated therewith.

As represented in FIG. 2, when connected to the internet (or an intranet), a client computer 208 (e.g., one of a very large number of client computers such as on the order of millions) can then request that a copy of the content 204 be downloaded. Note that the connection may be essentially continuous such as via DSL or cable modem, or may be dialed-up. For example, when connected to the internet, a client computer may automatically execute (e.g., daily) a program 210 to connect to a website backed by one or more update servers $212_1$-$212_m$, so as to essentially scan the client computer 208 to see whether any new software updates are available and needed (as established by the operations center 204) for installation on the client computer. If so, the client program 210 automatically requests the update or updates.

In accordance with an aspect of the present invention, when client systems initially request a download, the client servers are provided with information that controls the download. In one implementation, this is accomplished by using redirection or the like to provide a URL to a current download regulation file, e.g., maintained on one of the data centers such as the download regulation file $214_1$ maintained on the data center $206_1$. Note that although in FIG. 2 the data centers $210_1$-$210_n$ each contain the download regulation files, $214_1$-$214_n$, respectively, it is alternatively feasible to store these download regulation files anywhere on the internet, such as in the content update servers $212_1$-$212_m$. Further, although FIG. 2 shows an environment configured to handle very large scale downloading operations, e.g., with separate update servers and data centers, it can be readily appreciated that the present invention need not have separate update servers and data centers, but rather can be implemented using one or more servers as appropriate for the operating scale.

The download regulation files $214_1$-$214_n$ need not be identical to one another, e.g., the files' parameters may be different to account for regional differences that may exist, as described below. For example, in FIG. 2, the client computer 208 is provided with the URL to download a copy $214_{1c}$ of the regulation file $214_1$ on the data center $206_1$, for reasons which may be regionally based.

The information in the download regulation files $214_1$-$214_n$ is published by the operations center 204, and is generally based on network statistics and the loads of the update servers $212_1$-$212_m$, as well as based on the loads for the server data centers $214_1$-$214_n$ that propagate the updates. Other criteria may be factored in, e.g., the size of the update, along with general network information such as currently known internet problems. To this end, a network/server statistics collector 220 may be used to collect the statistics (including any other criteria data) 222. Based on these statistics 222, the download regulation file 214 is created and thereafter regularly updated by a download regulation file (DRF) parameter calculation mechanism 224.

Note that in this architecture, the gathered statistics 222 may be regional, and the (DRF) parameter calculation mechanism 224 can thus generate different download regulation files $2141$-$214n$ as appropriate for each region. By way of example, download regulation files can be generated for different regions of the internet such as the Far East, Europe, USA, Africa, and so forth. As a result, if a internet backbone problem develops, e.g., in Europe, the DRF for Europe can be dynamically updated to reflect network/server loads in that region without affecting response in other parts of the network around the world.

It should be noted that the collected statistics may not comprise a substantial amount of data, nor may the calculations performed by the DRF parameter calculation mechanism 224 be particularly complex. For example, simple data such as whether current load is increasing or decreasing may be sufficient to tweak the parameters in the download regulation file in an appropriate direction to compensate for the current state change. Alternatively, actual measurements such as a percentage of current capacity/load may be made and used. Thus, in one implementation the operations center 204 regularly updates the download regulation files $214_1$-$214_n$ based on empirically-observed data, however it can be readily appreciated that more complex (e.g., prediction-based or previously-observed, pattern-based) calculations may be used.

In one implementation, each download regulation file (e.g., $214_{1c}$) contains a download acceptance percentage and a download time. The download acceptance percentage comprises a value that informs the clients on what the probability is that they should start/continue the download. For example, if the acceptance percentage is seventy percent, then only (approximately) seventy percent of the clients will decide to download, such as by having the update code 210 in each client generate a random number between zero and one, and downloading only if the random number is below 0.7 (although the comparison alternatively may be that those that get to download are those clients that randomly generate a value of 0.3 or above). Clients that generated random numbers or the like that do not meet the threshold value corresponding to the acceptance percentage back off and retry later.

Clients that meet the acceptance percentage threshold may then request the update. For example, the client's download regulation file $214_{1c}$, essentially may include (or be used as) a ticket/cookie when accessing the data center $206_1$ so that instead of again sending a copy of the download regulation file, the data center begins downloading the content $204_1$. Alternatively, the download regulation file may include a URL (or parameter data that can be appended to the URL) by which the content $204_1$ is accessed instead of accessing the download regulation file via its URL. Other mechanisms of providing access to the content instead of the download regulation file are feasible.

Note that in this implementation, the download regulation files are static files (until their next update), and are cachable in the network (e.g., on edge caching servers). This tends to spread out the client load, as clients retrieve the download regulation file and get locally cached copies from edge caching servers held in various caching proxies and servers between the client system and the update servers or data centers (or other servers) that have the download regulation files. Note that download regulation files can be set with an HTTP 'expires' tag (or equivalent) so that the lifetimes of the data contained therein can be controlled.

For each client that is downloading the file (based on whether the client met the acceptance percentage), the download time represents a time window in which the client can continue to download, or for clients that are not downloading, that is, those that have backed off, the download time represents a wait time before retrying. Thus, if the download time value is thirty minutes, a client that meets the acceptance percentage is allowed to download for up to thirty minutes, while clients that do not meet the acceptance percentage back off for thirty minutes. Note that in one implementation, only a single download time value may be provided for both purposes, however in an alternative implementation, the downloading window time and the wait time can be provided as separate parameters, e.g., download for up to fifteen minutes or wait for one hour depending on whether the random number met the acceptance percentage-based threshold.

If a system that is downloading cannot finish downloading the requested content within the time window, then that system will re-read the download regulation file, and make a new decision as to whether to resume downloading or wait. Similarly, upon expiration of the wait time for a system that is not downloading, the download regulation file is also re-read and the determination performed again as to whether to start/continue downloading, or to wait still further. Note that the download regulation file's data may have changed during the first time window, and re-reading it gets the latest parameter values. This re-reading corresponds to the regular updates of the download regulation files based on the collected statistics, as described above, because the parameters may regularly change. In the latest download regulation file, the acceptance percentage and time window parameters may have changed by the regular evaluation of load statistics, e.g., to increase the time window and/or decrease the acceptance percentage if load is too great, or decrease the time window and/or increase the acceptance percentage if load can be safely increased.

Figure 3:
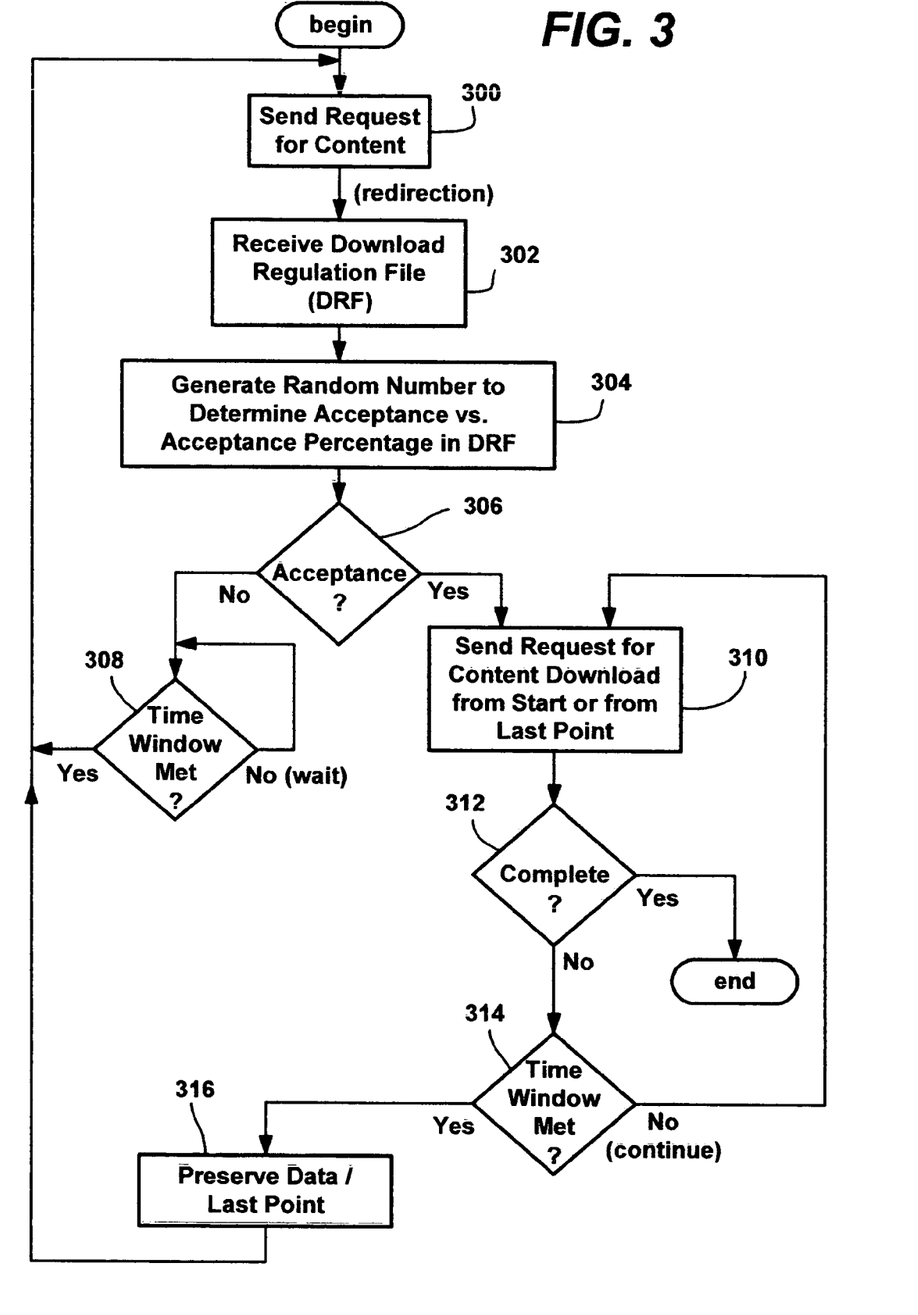
FIG. 3 is a flow diagram generally representing operations performed at the client to perform download regulation based on a data such as provided in a download regulation file, in accordance with an aspect of the present invention.

Turning to an explanation of the operation of the present invention with reference to the flow diagram of FIG. 3, in general each client system (as represented in FIG. 2 by the client computer 208) initially sends a request for content (step 300) and (e.g., via redirection) downloads a copy of the current download regulation file $214_{1c}$ (step 302). At step 304, the client such as via its code 210 generates a random number in order to determine via the comparison with the acceptance percentage at step 306 whether to start the download immediately, or wait before re-reading another copy of the download regulation file and trying again. If the client system is directed to wait by this internal comparison, then it will wait for a time specified in the download time window as represented by step 308, re-read another download regulation file (steps 300 and 302), and re-decide if it should initiate (or if previously initiated, continue) the download via steps 304 and 306. Note that instead of having the update code 210 perform these operations exemplified in steps 304-316, script code or the like can be provided (e.g., in a more complex download regulation file) and executed, or other code can be executed.

If the system determines that it should start/continue a download at step 306, then the client will go ahead and get the update, as represented by step 310. If the client can finish the update (step 312) within the time window (Step 314), the process ends with the client updated. If the client system can not finish downloading the update(s) within the time window, then the client will preserve what has been downloaded at step 316, re-read the re-read another download regulation file (steps 300 and 302), and re-decide if it should continue via steps 304 and 306.

Figure 4:
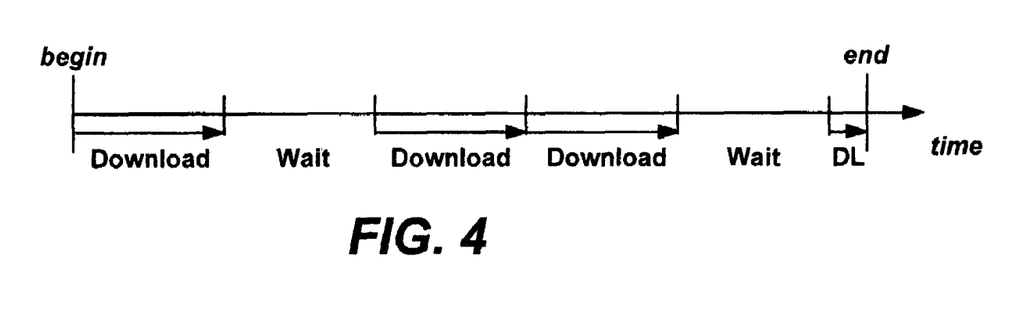
FIG. 4 is a timing diagram generally representing an example of timing windows for downloading and waiting to download for regulation purposes, in accordance with an aspect of the present invention.

The client will resume the download from the last point downloaded, although the client may have to wait one or more wait durations. FIG. 4 shows how a hypothetical download/wait sequence may occur, wherein the smaller tick marks between the beginning and end times identify the time windows. In FIG. 4, the user meets the acceptance percentage and begins downloading, continuing for the time window specified in the download regulation file. In FIG. 4, the download does not complete within the time window, and thus the user re-obtains and re-reads the (possibly updated) download regulation file to determine whether to continue or wait. This time, in the example of FIG. 4, the acceptance percentage-based threshold is not met, so the client waits for the (possibly changed) time window. The next two times, the client meets the acceptance percentage-based threshold each time, and thus downloads each time. The next time, however, the client waits. The last time, the client continues downloading but completes before the time window is reached, and thus the download is finished.

Note that the client may be configured to ignore the time window, for example, if the client knows that the download is almost complete. For example, a client that has received some large relative amount of a download, such as ninety-eight percent, may be configured to ignore the time window and instead go ahead and complete the download, such as if the client knows the download may only take a few more seconds to complete. Configuring the client code this way may be worthwhile to eliminate the network traffic and overhead of having to service one or more client requests to obtain new download regulation files to complete the download. The relative amount that is considered close enough to complete to allow finishing may be calculated in the client, e.g., time-based as computed by the size of the download and/or the download rate.

With respect to dial-up, dial-up is largely independent of the present invention. For example, automatic dial-up connections (including ISDN) are typically not made for individual customers, although some companies at remote sites may do so. If a dial-up connection is broken, the client can resume downloading (or waiting) from where it was within the time window, as if the connection was not broken, by tracking the actual download time or wait time. Alternatively, the time of disconnection can count against the time window, e.g., by checking the current time against a start time, whereby the client may need to re-read the download regulation file before resuming on a new connection if the time window has expired while disconnected. Note that dial-up trends may be considered among the criteria when setting the parameters in the download regulation file, e.g., some percentage of dial-up users are likely to disconnect and resume downloading and the parameters can be set in anticipation of such activity.

As is understood, in the system and method of the present invention, the individual clients each perform the probability-based determinations and time window-based expirations based on the data in the download regulation file. This shifts the burden of managing clients away from the distribution facility, and onto the clients themselves. In general, the distribution facility only needs to provide access (e.g., via a URL) to the download regulation file, and provide the updates.

By setting the parameters in the download regulation file, the initial spike of downloads may be spread over a longer time, which reduces the overall network and server load, lowers congestion, and keeps systems and networks from becoming overloaded. The parameter values can then be varied as needed, e.g., based on empirical measurements. In one actual implementation, it has been found that there is an initial surge of download activity that will last for one to three days depending on update package size and applicability to clients (how many client systems are affected). By varying the parameters in the download regulation file, the initial spike of downloads can be spread over a longer time (e.g., four days. This reduces the overall network and server load, lowering congestion keeping systems and networks from becoming overloaded.

Thus, for example, the parameters may be set to initially start the download regulation file with a lower acceptance percentage, and then gradually raise the acceptance percentage, based on a strategy of smoothing and lowering the initial download spike in network activity by spacing apart the total number of client download requests. The download regulation file can be manually updated or automatically updated, e.g., regularly in a closed loop system based on network/server utilization. If a network or data center problem occurs, in order to keep the system from becoming overloaded and unstable, the client load can be modulated as needed by varying the download regulation file.

Figure 5:
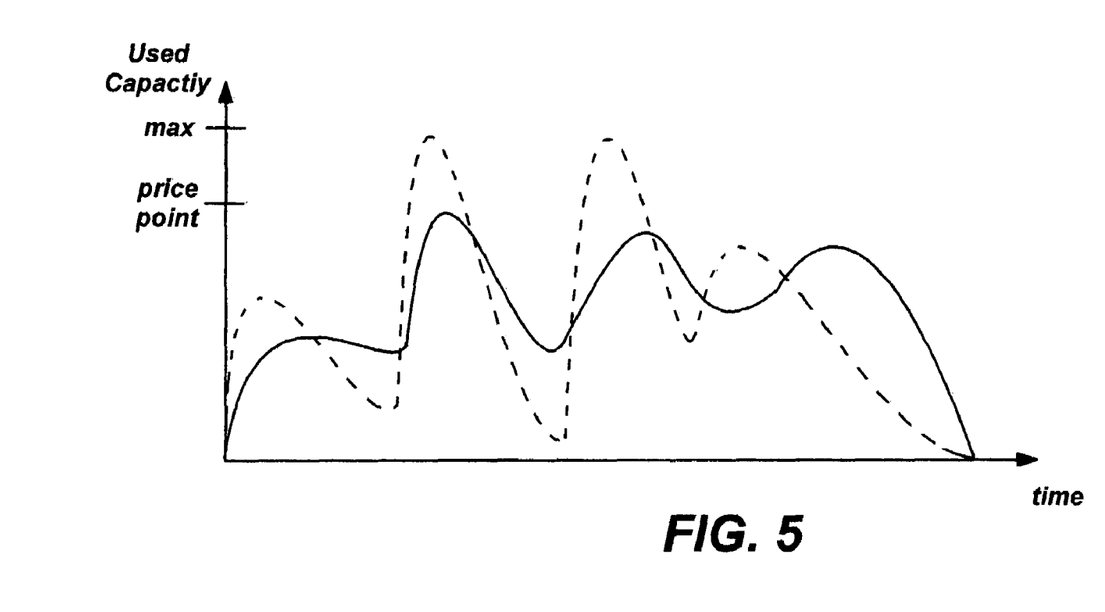
FIG. 5 is a hypothetical timing diagram showing an example of network download demand with and without network download regulation in accordance with an aspect of the present invention.

FIG. 5 shows a hypothetical example of a used capacity (demand) versus time graph, wherein the dashed line represents downloading some number of updates without network download regulation in place, and the solid line represents downloading updates with network download regulation in place. Essentially, the present invention smoothes the peaks by controllably directing some percentage of users to wait. Note that if FIG. 5 were based on actual data, the area under the two curves would be the same, i.e., the total number of downloaded bytes is substantially the same. Further, note that in addition to avoiding issues that would otherwise appear as maximum demand is approached, the present invention may provide significant benefits with respect to expense. This is because, for example, a content provider may have enough capacity to meet certain demand, as presented in FIG. 5 by the price point, but will have to acquire more capacity to meet the demand peaks, even though that extra capacity may be rarely used, or the provider may need to lease the capacity when needed, adding expense that can be avoided by the present invention.

The following table provides some example settings for download regulation files, along with a brief description of each one's corresponding effect:

| Download Acceptance Percent | Download Time Window | Overall Result |
|---|---|---|
| 0% | 30 min | All download requests will be delayed at the client and clients will start to retry after 30 minutes. Any existing download traffic will stop after 30 minutes (unless the DRF is updated). |
| 50% | 30 min | Half of the clients will wait for 30 minutes, and half will download immediately for up to 30 minutes; download traffic will peak at half of what it would in an uncontrolled loading situation. |
| 50% | 60 min | Download traffic at half (relative to uncontrolled loading); also sets the time clients check back and retry the download process to sixty minutes. This also will have the effect of extending client downloads, especially for clients with slow connections. |
| 100% | 30 min | All clients allowed to download content for up to thirty minutes before needing to re-check. |

Variations and alternatives to the above-described systems and methods may be provided. For example, in the above scheme, any client is essentially treated like any other and has the same probability of waiting each time the time window elapses. With a random distribution, this will lead to some statistically small number of clients taking much longer than other client systems take to get an update. This is true even given the same bandwidth to clients, since anything less than one-hundred percent acceptance with a large number of clients means some percentage of clients will have to wait, some percentage of those that waited will have to wait again, and so on.

This undesirable consequence can be mitigated by including more than one acceptance percentage in the download regulation file, e.g., there can be two acceptance percentage values, one to use the first time acceptance is calculated and a second to use on retries if, on the first pass, the system decides to wait instead of download. In this scenario, the second percentage will be larger than the first, giving clients that wait the equivalent of higher priority on their second and subsequent tries. This queue can be extended to include more than two acceptance percentages, however it is likely that more than three will give diminishing returns. The net effect is that the variation in the number of waits at the extreme ends of the distribution curve is reduced.

Another beneficial variation may be provided by varying the wait and/or download time. More particularly, in order to randomize client connections and keep any harmonic oscillations from developing as client systems connect, some randomness to these times can be added. For example, if a delay window time is thirty minutes, then the client could randomly wait for thirty minutes plus or minus a random time amount. Similarly, a client may download for the download time window for thirty minutes plus or minus a random time amount. Further, as described above, in one implementation, the acceptance time window has two meanings, namely the time window given to download a file if the client system decides to download, and the amount of time to wait before checking back and re-trying the download process. As described above, these may be provided as separate values, and if so, may be separately varied by some random amount if desired.

Another alternative addresses transient errors. More particularly, if there is a transient error during the download window, the client system can automatically wait for some predetermined amount of time before retry. For example, if the network connection to a server is lost due to network congestion, then the client system can wait for a pre-determined time, e.g., separately specified in the download regulation file, before trying to reconnect.

The present invention provides benefits over other mechanisms. For example, Multicast in the internet environment cannot generally be achieved, as almost no ISPs give customers direct access to the MBone Multicast Internet backbone. Further, most ISPs have not configured their networks to support multicast on behalf of customers, that is even if they have multicast capable hardware, it is not enabled or supported. A system that was based on explicit replies to each client, giving approval/denial on downloads can be accomplished, but is not desirable. In such a system, during heavy load, this can be accomplished by telling some clients that there are no updates available. Alternatively, an individual response at the connection for proceed/wait to download (e.g., via an HTTP 503 Unavailable response if using HTTP protocol) can be crafted. However, these alternatives are not as advantageous because the processing load on the servers will be increased as the server determines the immediate result of each client's request, and also because the loading on the servers increases as clients retry. Also, such schemes cannot use caching servers, as all of the requests must go back to the update servers for evaluation. As the client loading can reach huge numbers, this becomes a scaling issue.

As can be seen from the foregoing detailed description, there is provided a network download regulation method and system that directs clients wishing to download content to regulate themselves in a manner that controls load on the servers. The regulation is based on parameters provided by the content source, which in turn may be based on current network-load statistical considerations measured at the source. Thus client systems, particularly those performing automatic downloads, obtain the content in a controlled manner so as to not overload network resources.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for regulating the amount of bandwidth consumed by a plurality of download network connections by limiting the number of simultaneous connections to a download server, the method comprising:

(a) communicating a content-related request to a download service, and in response to the content-related request, receiving download regulation data corresponding to an acceptance value and a time-window set containing at least one time value;

(b) determining based on the acceptance value received in response to the content-related request whether to request the content or whether to delay for a wait time before communicating another content-related request, the wait time corresponding to a wait time value in the time-window set; and (i) when the determination result is to request the content, downloading the content for not more than the duration of a download time, and if the download is not completed within the download time, repeating steps (a) and (b) until the download is finished, the download time corresponding to a download time value in the time-window set, and (ii) when the determination result is to back off, waiting for a duration of time specified by the wait time and then repeating steps (a) and (b) until the download is finished.

2. The method of claim 1 wherein the download time value and the wait time value both correspond to the same time value in the time-window set.

3. The method of claim 1 wherein receiving said download regulation data corresponding to said acceptance value and said time-window set comprises receiving a URL to a download regulation file.

4. The method of claim 1 wherein determining whether to request the content or whether to back off comprises, generating a random number and comparing the random number with a number corresponding to the acceptance value.

5. The method of claim 1 further comprising setting the wait time corresponding to the wait time value in the time-window set by obtaining the wait time value from the time-window set and varying the obtained wait time value by a random time amount.

6. The method of claim 1 further comprising setting the download time corresponding to a download time value in the time-window set by obtaining the download time value from the time-window set and varying the obtained download time value by a random time amount.

7. The method of claim 1 wherein the determination result is to back off, further comprising, obtaining another acceptance percentage value from the download regulation data, setting that other acceptance percentage value as the current acceptance percentage value, and repeating step (b).

8. A computer-readable storage medium storing computer-executable instructions, which when executed, perform the method of claim 1.

9. The method of claim 1, wherein the download regulation data received in response to the client request is the uniform across all clients and is independent of the clients identity.

10. In a computing environment, a method of regulating access to content, comprising:

receiving a content-related request, and in response, providing download regulation data comprising at least one probability value that directs which clients can download the content, wherein access to the content is regulated by said clients determining from the probability value whether to download the content or wait until later to download the content, and a time-window set containing a plurality of time values including a time value specifying a maximum length of time a client may download content corresponding to the content-related request and a time value specifying a minimum length of time said clients that determine to wait are to delay; and updating the down regulation data provided in response to subsequent content-related requests based on network load.

11. The method of claim 10 wherein each probability value corresponds to a percentage, and wherein access to the content is regulated by said clients determining from the probability value whether they meet a threshold based on the percentage.

12. The method of claim 10 wherein the said download regulation data contains at least first and second probability values, and wherein said clients that have not waited determine from the first probability value whether to download or wait, and said clients that have waited determine from the second probability value whether to download or further wait.

13. The method of claim 10 wherein updating the said download regulation data based on network load comprises obtaining information corresponding to regional load, and wherein providing download regulation data comprises said clients with a download regulation data file corresponding to each client's region.

14. A computer-readable storage medium storing computer-executable instructions, which, when executed, perform a method of regulating access to content, the method comprising:

receiving a content-related request, and in response, providing download regulation data comprising at least one probability value that directs which clients can download the content, wherein access to the content is regulated by said clients determining from the probability value whether to download the content or wait until later to download the content, and a time-window set containing a plurality of time values including a time value specifying a maximum length of time a client may download content corresponding to the content-related request and a time value specifying a minimum length of time said clients that determine to wait are to delay, wherein the same download regulation data is provided to all client request; and updating the down regulation data provided in response to subsequent content-related requests based on network load.

15. A computer-readable storage medium having stored thereon a data structure for regulating the downloading of content to a plurality of clients, the method comprising:

a first set of data corresponding to an acceptance value, the acceptance value corresponding to a single probability value that regulates the percentage of the plurality of clients that will start a download immediately after evaluating the acceptance value;

a second set of data corresponding to at least one time value; and wherein the data structure is configured to be returned to a client in response to a content-related request, and for the client to determine from the acceptance value in the first set of data whether to request the content immediately and proceed to download the content for a length of time not to exceed a download time or whether to back off for a wait time before performing an additional content-related request, the download time corresponding to a download time value in the second set of data and the wait time corresponding to a wait time value in the second set of data.

16. In a computer network having unmanaged clients, a system comprising:

means for determining whether a software update is needed;

means for requesting the software update in response to a determination that a software update is needed;

means for receiving a download regulation file in response to the request for the software update; and means for processing the download regulation file to determine whether to download the software update immediately for a duration not to exceed a time determined by the processing of the download regulation file or wait until a later time to perform an additional content-related request, including means for generating a random number and means for comparing the random number against an acceptance value in the download regulation file.

* * * * *

UNITED STATES PATENT AND TRADEMARK OFFICE
CERTIFICATE OF CORRECTION

PATENT NO. : 7,441,041 B2  Page 1 of 1
APPLICATION NO. : 10/724518
DATED : October 21, 2008
INVENTOR(S) : Peter A. Williams et al.

It is certified that error appears in the above-identified patent and that said Letters Patent is hereby corrected as shown below:

In Title page, in field (75), under "Inventors" column 1, line 3, delete "Jeff" and insert -- Jeffrey --, therefor.

Signed and Sealed this
Third Day of May, 2011

David J. Kappos
*Director of the United States Patent and Trademark Office*